(12) United States Patent
Penzo et al.

(10) Patent No.: US 7,482,411 B2
(45) Date of Patent: Jan. 27, 2009

(54) GAS-PHASE OLEFIN POLYMERIZATION PROCESS

(75) Inventors: Guiseppe Penzo, Mantova (IT); Gabriele Mei, Ferrara (IT); Gerben Meier, Frankfurt (DE)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 10/553,476

(22) PCT Filed: Apr. 1, 2004

(86) PCT No.: PCT/EP2004/003638

§ 371 (c)(1),
(2), (4) Date: Oct. 17, 2005

(87) PCT Pub. No.: WO2004/092228

PCT Pub. Date: Oct. 28, 2004

(65) Prior Publication Data

US 2007/0004879 A1 Jan. 4, 2007

Related U.S. Application Data

(60) Provisional application No. 60/482,702, filed on Jun. 26, 2003.

(30) Foreign Application Priority Data

Apr. 17, 2003 (EP) .................. 03076135

(51) Int. Cl.
*C08F 2/34* (2006.01)
*B01J 19/24* (2006.01)

(52) U.S. Cl. .............................. 526/70; 526/67; 526/68; 526/901; 526/918; 422/132

(58) Field of Classification Search ................... 526/67, 526/68, 70, 901, 918; 422/132, 140
See application file for complete search history.

(56) References Cited

U.S. PATENT DOCUMENTS 4,588,790 A 5/1986 Jenkins, III et al. ............ 526/70
5,239,022 A 8/1993 Winter et al. ................ 526/127

(Continued)

FOREIGN PATENT DOCUMENTS

EP 0089691 9/1983

(Continued)

*Primary Examiner*—Fred M Teskin
(74) *Attorney, Agent, or Firm*—Jarrod N. Raphael

(57) ABSTRACT

A continuous process for the olefin polymerization in a fluidized bed reactor, said process comprising continuously passing a gaseous stream comprising one or more α-olefin monomers through the fluidized bed in the presence of a polymerization catalyst under reactive conditions, withdrawing polymeric product and unreacted fluids from the reactor, cooling part of said unreacted fluids below the dew point to form a two-phase mixture of gas and condensed liquid and reintroducing said two-phase mixture into the reactor, the process being characterized in that said two-phase mixture is reintroduced under the distribution plate of the reactor so that a part of condensed liquid is separated from the gas and is successively fed above the fluidized bed through an external pipe connecting the bottom of the reactor to a point situated above the upper limit of the fluidized bed of polymer particles.

33 Claims, 1 Drawing Sheet

U.S. PATENT DOCUMENTS

| | | | | |
|---|---|---|---|---|
| 5,243,001 A | 9/1993 | Winter et al. | | 526/127 |
| 5,324,800 A | 6/1994 | Welborn, Jr. et al. | | 526/160 |
| 5,434,228 A * | 7/1995 | Morterol et al. | | 526/67 |
| 5,556,928 A | 9/1996 | Devore et al. | | 526/127 |
| 6,306,981 B1 | 10/2001 | Brown et al. | | 526/68 |

FOREIGN PATENT DOCUMENTS

| | | |
|---|---|---|
| EP | 0129368 | 12/1984 |
| EP | 0416815 | 3/1991 |
| EP | 0420436 | 4/1991 |
| EP | 0485820 | 5/1992 |
| EP | 0485822 | 5/1992 |
| EP | 0643066 | 3/1995 |
| EP | 0671404 | 9/1995 |
| EP | 0699213 | 3/1996 |
| EP | 0825204 | 2/1998 |
| EP | 1041087 | 10/2000 |
| WO | 9104257 | 4/1991 |
| WO | 9622995 | 8/1996 |
| WO | 9822486 | 5/1998 |
| WO | 9924446 | 5/1999 |
| WO | 9958539 | 11/1999 |
| WO | 0241986 | 5/2002 |

* cited by examiner

GAS-PHASE OLEFIN POLYMERIZATION PROCESS

The present invention relates to a process for the gas-phase polymerization of olefins in a fluidized bed reactor.

The development of catalysts with high activity and selectivity of the Ziegler-Natta type and, more recently, of the metallocene type has led to the widespread use on an industrial scale of processes in which the olefin polymerization is carried out in a gaseous medium in the presence of a solid catalyst. An example of said gas-phase polymerization processes involves the use of a fluidized bed reactor wherein a bed of polymer particles are maintained in a fluidized state by the upward flow of gaseous monomer. During the polymerization, fresh polymer is generated by catalytic polymerization of the monomer and polymer product is continuously withdrawn to maintain the bed at a constant volume. Industrial processes employ a distribution plate to dispense the fluidizing gas to the bed, and to act as a support for the bed when the supply of gas is cut off. The polymer product is generally withdrawn from the reactor via a discharge conduit arranged in the lower portion of the reactor near the distribution plate. The fluidized bed comprises a bed of growing polymer particles and catalyst particles. This reaction mixture is maintained in a fluidized condition by the continuos upward flow of a fluidizing gas which comprises recycle gas and monomer make-up. The fluidizing gas enters the bottom of the reactor and is passed through the distribution plate to the fluidized bed.

The polymerization of olefins is an exothermic reaction and it is therefore necessary to provide means to cool the bed to remove the heat of polymerization. In the absence of such cooling the bed would increase in temperature until, for example, the catalyst turns inactive or the polymer particles are partially fused. In a fluidized bed polymerization, the preferred method for removing the heat of polymerization is by feeding to the polymerization reactor a recycle gas stream at a temperature lower than the desired polymerization temperature. Such a gas stream, while passing through the fluidized bed, allows conducting away the heat of polymerization. The recycle gas stream is withdrawn from the upper zone of the reactor, cooled by passage through an external heat exchanger and then recycled to the reactor. The temperature of the recycle gas can be adjusted in the heat exchanger to maintain the fluidized bed at the desired polymerization temperature. According to this method of reactor cooling, the recycle gas stream generally comprises, besides the gaseous monomers, also inert and diluent gases, such as propane, and gaseous chain transfer agents, such as hydrogen. Thus, the recycle gas stream serves to supply the monomer to the bed, to fluidize the bed and also to maintain the bed at the desired temperature. Monomers consumed by the polymerization reaction are normally replaced by adding make-up gas to the recycle gas stream.

It is well known that the space time yield, in terms of weight of polymer produced per unit volume of reactor and per unit time, in a commercial gas fluidized bed reactor is limited by the maximum rate at which the heat of polymerization can be removed from the reactor. The rate of heat removal can be increased, for example, by increasing the velocity of the recycle gas and/or reducing the temperature of the recycle gas. However, there is a limit to the velocity of the recycle gas that can be employed in the industrial practice. Beyond this limit the bed can become unstable or even lift out of the reactor along with the gas stream, leading to blockage of the recycle line and damage to the recycle gas compressor.

There is also a limit on the extent to which the recycle gas can be cooled in practice. This is primarily determined by economic considerations, and in practice is normally determined by the temperature of the industrial cooling water available on site. Refrigeration can be employed if desired, but this adds to the production costs.

Thus, in the commercial practice the use of cooled recycle gas as the only means of removing the heat of polymerization from the gas fluidized bed reactor has the disadvantage of limiting the maximum production rate. In order to overcome this disadvantage, different methods have been suggested for removing the heat of polymerization from a fluidized bed polymerization process.

EP 89 691 relates to a process for increasing the space time yield in a continuous gas fluidized bed process for the polymerization of olefins. According to this patent, the recycle gas stream is intentionally cooled to a temperature below the dew point of the recycle gas stream to produce a two-phase gas/liquid mixture under conditions such that the liquid phase of said mixture will remain entrained in the gas phase of said mixture. The heat of polymerization is removed by introducing said two-phase mixture into the reactor at a point in the lower region of the reactor, and most preferably at the bottom of the reactor to ensure uniformity of the fluid stream passing upwardly through the fluidized bed. The evaporation of the liquid phase takes place inside the polymerization bed and this ensures a more effective removal of the heat of polymerization. This technique is referred to as operation in the "condensing mode". By operating in the "condensing mode", the cooling capacity of the recycle stream is increased by both the vaporization of the condensed liquids entrained in the recycle stream and as a result of the greater temperature gradient between the entering recycle stream and the reactor. The specification of EP 89 691 states that the quantity of condensed liquid contained in the gas phase should not exceed about 20% by weight and preferably should not exceed about 10% by weight, provided that the velocity of the two-phase recycle stream is high enough to keep the liquid phase in suspension in the gas and to support the fluidized bed in the reactor. The recycle system described in this patent is such that all the condensed liquid is introduced in the lower region of the fluidized bed. As a consequence, the cooling capacity of the recycle stream in the upper region of the fluidized bed is very poor.

U.S. Pat. No. 4,588,790 also relates to a polymerization process of olefins in a fluidized bed reactor by operating in the "condensing mode". This patent deals with the problem of the carryover of solid particles in the recycle stream. The smallest polymer particles, also called the "fines", are carried over by the gaseous stream and are recycled to the reactor together with the liquid phase so that they can create undesiderable "mud" inside the fluidized bed. This "mud" can be formed by the wetting of the fines, their agglomeration and accumulation as "chunks" in regions of relatively low velocity in the system, for instance near the gas distribution plate. In order to minimize the formation of "mud", the specification of U.S. Pat. No. 4,588,790 states that the weight ratio of liquid to solids in the recycle stream should not be less than about 2:1. The higher is said ratio, the lower is the probability of formation of chunks when the "condensing mode" is adopted. As regards the introduction of the condensed liquid inside the fluidized bed, this patent discloses the possibility of splitting the two-phase mixture in more separated streams, and some of them can be introduced directly into the fluidized bed. However, the gases introduced below the fluidized bed must be sufficient to support the fluidized bed and to maintain it in a fluidization condition. Accordingly, the major portion of the two-phase gas/liquid mixture must necessarily be fed at a point below the fluidized bed: this limitation makes ineffective the cooling capacity of the recycle stream in the upper region of the fluidized bed.

EP 699 213 relates to a continues fluidized bed process for the polymerization of olefins operating in the condensing mode. According to this patent, after the cooling of the recycle stream at a temperature below its dew point, at least part of the condensed liquid is separated by the gas phase and introduced directly into the fluidized bed. In order to gain the maximum benefit in term of cooling of the fluidized bed, the separated liquid must be introduced in the region of the bed that has substantially reached the temperature of the gaseous stream leaving the reactor. The introduction of the separated liquid may be carried out at a plurality of points within this region of the fluidized bed, and these points may be at different heights within this region. For example, the points of introduction of the liquid into the fluidized bed may be approximately 50-70 cm above the fluidization grid. Injection means are required, preferably nozzles, arranged such that they protrude substantially vertically into the fluidized bed or may be arranged such that they protrude from the walls of the reactor in a substantially horizontal direction. The presence of said injection means could cause undesirable turbulence and serious risk of fouling due to the creation of dead spots in the vicinity of the nozzles or similar injection means. Another drawback of this process is due to the fact that additional equipment is required in the recycle line for separating the condensed liquid from the gas phase, in particular cyclone separators, demister type gas-liquid separators or liquid scrubbers. Furthermore, a pump must be provided downstream the separator in order to allow the injection of the separated liquid along the axis of fluidized bed. As a consequence, the recycle system described in this patent increases the plant costs and the complexity of the plant setup.

Also the process of U.S. Pat. No. 6,306,981 requires a separation step wherein at least part of the condensed liquid is separated from the gas phase by means of a separator. According to the teaching of this patent, the separated liquid is transferred by a pump to the reactor and introduced peripherally in the upper portion of the fluidized bed at a location in proximity of the reactor walls. A film of liquid is formed which flows downward along the reactor walls. The vaporization of said liquid film cools the upper region of the fluidized bed without causing an undesirable turbulence in the central core region of the fluidized bed. The process described in this patent improves the level of cooling of the fluidized bed, however also in this case both the gas/liquid separator and the pump along the recycle line increase the plant costs and the complexity of the plant setup.

According to EP 825 204, the gas/liquid mixture obtained by cooling the recycle stream is transferred to the bottom of a fluidized bed reactor, where the condensed liquid is separated from the gaseous stream in a separator which is integral with the fluidized bed reactor. The liquid is withdrawn from the bottom of said integral separator and is introduced into the lower part of the fluidized bed. Also this process requires the use of injection means, preferably nozzles, arranged so as to protrude substantially vertically into the fluidized bed or to protrude from the walls of the reactor in a substantially horizontal direction. The presence of said injection means can cause undesirable turbulence and serious risk of fouling due to the creation of dead spots in the vicinity of the nozzles or other injection means. Furthermore, also this process requires the presence of a pump, downstream the integral separator, for introducing the condensed liquid inside the fluidized bed and for maintaining a continuous circulation and stirring of liquid at the bottom of the integral separator.

It would be desirable to improve the process described in EP 825 204 by avoiding the use of liquid injection means directly protruding into the fluidized bed of polymer particles and, at the same time, simplifying the equipment involved in the recycle line. It has now been found that a particular arrangement in the recycle line of the gas/liquid mixture allows to obtain a more effective cooling of a fluidized bed reactor with the advantages of reducing the complexity of the plant setup and avoiding the use of injection means directly protruding into the fluidized bed.

It is an object of the present invention a continuous process for the olefin polymerization in a fluidized bed reactor, said process comprising continuously passing a gaseous stream comprising one or more α-olefin monomers through the fluidized bed in the presence of a polymerization catalyst under reactive conditions, withdrawing polymeric product and unreacted fluids from the reactor, cooling part of said unreacted fluids below the dew point to form a two-phase mixture of gas and condensed liquid and reintroducing said two-phase mixture into the reactor, the process being characterized in that:

said two-phase mixture is reintroduced under the distribution plate of the reactor so that a part of condensed liquid is separated from the gas and is successively fed above the fluidized bed through an external pipe connecting the bottom of the reactor to a point situated above the upper limit of the fluidized bed of polymer particles.

Figures 1, 2:
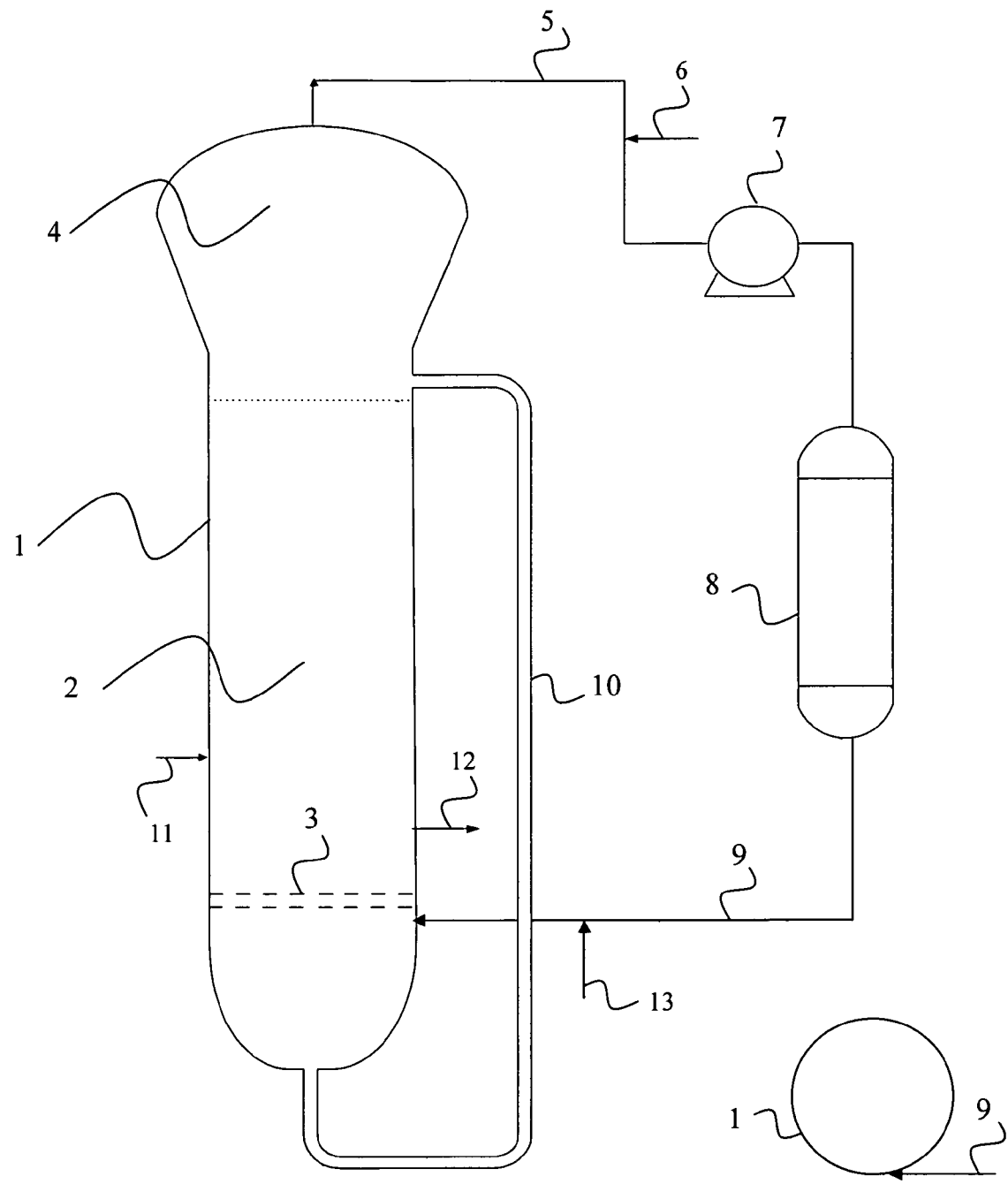
FIG. 1 shows an embodiment of the present invention, where a fluidized bed reactor is provided with an external pipe to perform an olefin polymerization process.
FIG. 2 shows a top view of a section of the fluidized bed reactor of FIG. 1, at a level situated just below the distribution plate.

In the present invention the term "external pipe" is referred to a pipe running outside the fluidized bed reactor, the inlet of said pipe being placed at the bottom end of the reactor, the outlet of said pipe being placed above the fluidized bed of polymer particles.

According to an embodiment of the present invention, the two-phase mixture formed by cooling the unreacted fluids at a temperature below the dew point is reintroduced into the fluidized bed reactor along a direction which is tangential to the reactor walls. Due to this tangential inlet, a part of condensed liquid is separated from the gas by a "centrifugal effect" involved in the zone underlying the distribution plate. Generally, the inlet point of the two-phase mixture into the reactor is situated close to and just below the distribution plate in order to exploit all the space underlying the distribution plate to carry out the above separation.

According to another embodiment, the above separation is achieved by means of one or more baffles placed near the point of reintroduction of the two-phase mixture into the reactor. In this case, a part of condensed liquid is separated from the gas by coalescence of liquid droplets on said baffles and consequent fall by gravity.

In both the embodiments, the separated liquid collects at the bottom of the zone underlying the distribution plate before entering the external pipe. The amount of liquid entering the external pipe is generally comprised in the range of from 20 to 50% by weight of the total condensed liquid. On the other hand, the remaining part of condensed liquid, generally comprised between 50% and 80% by weight of the total condensed liquid, enters the fluidized bed passing through the slots of the distribution plate.

Only a partial and raw separation of the liquid from the gas is carried out in the reactor zone underlying the distribution plate, so that a two-phase mixture enriched in liquid collects in proximity of the inlet of the external pipe and runs through said pipe, while a two-phase mixture enriched in gas passes through the distribution plate. The latter provides the fluidizing gas needed to keep the polymer bed in a fluidization state.

Many advantages can be accomplished by carrying out the process of the invention. In the first place, the introduction of condensed liquid above the fluidized bed improves the cooling of the upper region of the fluidized bed without causing any turbulence and interference with the fluidization conditions of the polymer bed. Simultaneously, the remaining part of condensed liquid moves upwards through the distribution plate so as to effect a good cooling of the lower region of the bed. In order to obtain these advantages, it is essential to arrange a pipe connecting the bottom of the reactor to a region of the reactor situated over the fluidized bed.

According to the present invention, the liquid flows upward in the external pipe without requiring pumping devices. In fact, the pressure gradient $\Delta p$ existing between the zone underlying the distribution plate and the zone overlying the polymer fluidized bed causes freely the fluid to flow upwards along said pipe. In a manner unknown in the prior art embodiments said pressure gradient, which is made available by the recycle compressor, can be exploited to introduce the condensed liquid into the reactor without using additional pumps or similar devices.

As known, a fluidized bed reactor includes at its top a velocity reduction zone, which is generally of increased diameter compared to the diameter of the fluidized bed portion of the reactor. At the outlet of the external pipe, the liquid is preferably introduced into the fluidized bed reactor at a point situated above the upper limit of the fluidized bed and below the velocity reduction zone. The liquid can be simply poured onto the top of the fluidized bed or can be sprayed onto the top of the fluidized bed by means of injection devices, such as a plurality of nozzles. One or more feeding points placed along a circumference overlying the fluidized bed can be provided.

It is preferred to operate in such a way that an annular flow of liquid is established inside the external pipe, while the central section thereof is preferably occupied by the upward flow of gas. By so operating, the liquid strictly adheres to the walls of the pipe so as to reduce the probability of clogging the pipe. In order to form said liquid annular film, the diameter of the external pipe should be suitably selected taking into account the liquid flow rate and the pressure gradient $\Delta p$ existing between the inlet and the outlet of the external pipe. It has been found that the formation of said liquid annular flow is favoured when the liquid entering the external pipe is in an amount comprised from 10 to 20% by weight with respect to the amount of gas entering said pipe. As regards the diameter of the external pipe, this parameter is generally selected at a value of less than $0.15\ D_R$, where $D_R$ is the diameter of the fluidized bed reactor. Above this upper limit, an excessive amount of gas enters the external pipe and, as a consequence, the gas passing through the distribution plate is not enough to support the fluidized bed of polymer. A suitable range for the diameter of the external pipe is from 0.01 to 0.15 $D_R$, preferably from 0.02 to 0.08 $D_R$. A further advantage of the invention is that the centrifugal effect involved by the tangential inlet of the recycle stream favours a concentration of the recycled "fines" at the bottom part of the reactor, so that most of the fines are forced to run the external pipe. As a consequence, the process of the invention allows to by-pass the "fines" to the upper region of the fluidized bed reactor, thereby minimizing the amount of fines discharged via the product discharge valve located in the bottom region of the fluidized bed reactor. By doing so, the catalyst yield can be increased.

According to the invention, the gaseous stream which is continuously passed through the fluidized bed comprises one or more α-olefin monomers. Suitable α-olefin monomers are those of formula $CH_2=CHR$, where R is hydrogen or a hydrocarbon radical having 1-12 car-bon atoms. Said gaseous stream can also include one or more alkanes or cycloalkanes as inert condensable gases. Preferably $C_4$-$C_8$ alkanes or cycloalkanes are used as inert condensable gases, in particular butane, pentane or hexane.

Generally, the recycle stream is cooled at a temperature under the dew point to a such extent that it is formed an amount of condensed liquid not exceeding 20% by weight of the total amount of liquid and gas. Preferably, the amount of condensed liquid does not exceed 12% by weight of the total amount of liquid and gas. The condensed liquid comes from the condensable monomers, e.g. propylene, butene-1, hexene-1, octene and the inert condensable gases, e.g. propane, butane, pentane or hexane.

The present invention is now described in detail with reference to the attached FIGS. 1-2, which are given for illustrative purpose not limiting the scope of the invention.

FIG. 1 shows a fluidized bed reactor comprising a reactor body 1 including a fluidized bed 2 of polymer, a fluidization plate 3 and a velocity reduction zone 4. The velocity reduction zone 4 is generally of increased diameter compared to the diameter of the fluidized bed portion of the reactor. The gaseous stream leaving the top of the velocity reduction zone 4 comprises, besides the unreacted monomers, also inert condensable gases, such as isopentane, as well as inert non-condensable gases, such as nitrogen. Said gaseous stream is compressed, cooled and recycled to the bottom of the fluidized bed reactor: from the top of the velocity reduction zone 4 the gaseous stream is transferred via recycle line 5 to a compressor 7 and then to a heat exchanger 8. If appropriate, the recycle line 5 is equipped with a line 6 for feeding monomers, molecular weight regulators and, optionally inert gases. Passing through the heat exchanger 8, the gaseous stream is cooled below its dew point to form a two-phase mixture of gas and condensed liquid. Said two-phase mixture obtained at the outlet of the heat exchanger 8 is transferred to the bottom of the fluidized bed reactor via line 9. The inlet point of line 9 in the reactor is situated just below the distribution plate 3 and the direction of the inlet of said line 9 is tangential to the reactor wall. Said tangential inlet favours a "centrifugal effect" in the zone underlying the distribution plate 3 so that part of the liquid contained in the two-phase mixture is collected at the bottom part of said zone. As a consequence, a liquid/gas mixture enriched in liquid flows through the external pipe 10, while a liquid/gas mixture enriched in gas passes through the slots of the distribution plate 3. In this way an amount of upwardly flowing gas sufficient to maintain the bed in a fluidized condition is ensured.

The inlet of the external pipe 10 is placed at the bottom end of the fluidized bed reactor while the outlet of the pipe 10 is situated above the upper limit of the fluidized bed 2 and below the velocity reduction zone 4. No pumping devices are required to guarantee the flow of condensed liquid upwardly into the external pipe 10. At the outlet of the external pipe 10, the liquid is sprayed onto the top of the fluidized bed 2 by means of injection devices (not shown).

Generally, the various catalyst components are fed to the reactor through a line 11 that is preferably placed in the lower part of the fluidized bed 2. The polymer can be discharged through a line 12 placed at the bottom of the fluidized bed 2.

Make-up monomers can be also introduced into the reactor in either liquid or gaseous form via line 13.

FIG. 2 is a sectional view of the reactor body 1 at a level situated just below the distribution plate 3 in correspondence of the inlet point of line 9 in the reactor: as shown, the direction of the inlet of line 9 is tangential to the reactor wall.

The process of the invention is operated with a gas velocity in the fluidised bed which must be greater or equal to that required for the fluidisation of the bed. The polymerisation is preferably carried out by using a gas velocity in the range 40 to 100 cm/sec, more preferably 50 to 80 cm/sec. The distribution plate 3 can be of conventional design, for instance, a flat or dished plate perforated by a plurality of slots distributed more or less uniformly across its surface. Slots of rectangular shape and having a large opening, for instance 12×40 mm, are preferably adopted in the present invention: these slots foster the passage of a gas flow containing droplets of entrained liquid.

As it can be easily understood from the embodiment shown in FIG. 1, the remarkable advantages of the process of the invention in term of reactor cooling are obtained simplifying the equipment arranged along the recycle line, which comprises only a compressor and a heat exchanger, and avoiding the use of injection means of condensed liquid directly protruding into the fluidized bed.

The process according to the present invention is particularly suitable for the manufacture of polymers or copolymers of α-olefins, such as high density polyethylene (HDPE), linear low density polyethylene (LLDPE), polypropylene (PP), random copolymers (RACO) of ethylene and propylene, and of ethylene or propylene with other α-olefins, ethylene-propylene rubbers (EPR), ethylene-propylene-diene rubbers (EPDM), heterophasic copolymers (HECO).

The polymerization is generally carried out at a pressure of between 0.5 and 6 MPa and at a temperature of between 30 and 130° C. For instance, for LLDPE production the temperature is suitably in the range 80-90° C. and for HDPE the temperature is typically 85-105° C. depending on the activity of the catalyst system.

The polymerization process herewith described is not restricted to the use of any particular family of polymerization catalysts. The invention is useful in any exothermic polymerization reaction employing any catalyst, whether it is supported or unsupported, and regardless of whether it is in pre-polymerized form.

The polymerization reaction may be carried out in the presence of a catalyst system of the Ziegler-Natta type. Ziegler-Natta catalyst systems are solid catalyst systems comprising the reaction product of:

A) a solid component comprising a titanium compound supported on a magnesium halide in active form and optionally an electron donor compound (inside donor);

B) an alkyl aluminum compound, optionally in the presence of an electron donor compound (outside donor).

Suitable titanium compounds are Ti halides (such as $TiCl_4$, $TiCl_3$), Ti alcoholates, Ti haloalcoholates. Such high-activity catalyst systems are capable of producing large amounts of polymer in a relatively short time avoiding the step of removing catalyst residues from the polymer.

Other useful catalysts are the vanadium-based catalysts, which comprise the reaction product of a vanadium compound with an aluminum compound, optionally in the presence of a halogenated organic compound. Optionally the vanadium compound can be supported on an inorganic carrier, such as silica, alumina, magnesium chloride. Suitable vanadium compounds are $VCl_4$, $VCl_3$, $VOCl_3$, vanadium acetyl acetonate.

Other suitable catalysts are single site catalysts, i.e. compounds of a metal belonging to groups IIIA to VIIIA (IUPAC notation) of the Periodic Table of the Elements, including elements belonging to the group of the rare earth, linked with a π bond to one or more cyclopentadienyl type rings, utilized with a suitable activating compound, generally an alumoxane, such as those described in EP 129 368. As an example of single site catalysts, the "constrained geometry" catalysts can be used, such as those disclosed in EP 416 815. Well-known constrained geometry catalysts are described in EP-A-0 416 815, EP-A-0 420 436, EP-A-0 671 404, EP-A-0 643 066 and WO-A-91/04257. Also Metallocene complexes can be cited as single-site catalysts, such as those described in WO 98/22486, WO 99/58539 WO 99/24446, U.S. Pat. No. 5,556,928, WO 96/22995, EP-485822, EP-485820, U.S. Pat. No. 5,324,800 and EP-A-0 129 368. Heterocyclic metallocenes, such as those described in WO 98/22486 and WO 99/24446, can be also used.

Other useful catalysts are those based on chromium compounds, such as chromium oxide on silica, also known as Phillips catalysts.

The catalyst may suitably be employed in the form of a pre-polymer powder prepared beforehand during a pre-polymerization stage with the aid of a catalyst as described above. The pre-polymerization may be carried out by any suitable process, for example, polymerization in a liquid hydrocarbon diluent or in the gas phase using a batch process, a semi-continuos process or a continuos process.

The invention claimed is:

1. A continuous process for polymerizing olefins in a fluidized bed reactor, said process comprising:
continuously passing a gaseous stream comprising one or more α-olefin monomers through a fluidized bed with a polymerization catalyst under reactive conditions;
withdrawing a polymeric product and unreacted fluids from said fluidized bed reactor;
cooling part of said unreacted fluids below at least one dew point of said unreacted fluids to form a two-phase mixture comprising a gas and a condensed liquid; and
reintroducing said two-phase mixture into said fluidized bed reactor,
wherein said two-phase mixture is reintroduced under a distribution plate of said fluidized bed reactor in a direction which is tangential to at least one reactor wall, such that at least one part of said condensed liquid is separated from said gas, and said condensed liquid is fed above said fluidized bed through an external pipe connecting a bottom of said fluidized bed reactor to a position above an upper limit of said fluidized bed, the external pipe comprising an inlet below the distribution plate.

2. The process according to claim 1, wherein a separated liquid collects at a zone underlying said distribution plate before entering said external pipe.

3. The process according to claim 1, wherein a separated liquid enters said external pipe, said separated liquid comprises from 20 to 50% by weight of said condensed liquid.

4. The process according to claim 3, wherein said separated liquid flows upward in said external pipe without requiring a pumping device.

5. The process according to claim 3, wherein said separated liquid is introduced into said fluidized bed reactor at a position situated above said upper limit of said fluidized bed and below a velocity reduction zone.

6. The process according to claim 3, wherein said separated liquid is sprayed into said fluidized bed by an injection device.

7. The process according to claim 3, wherein said separated liquid comprises from 10 to 20% by weight of said gas entering said external pipe.

8. The process according to claim 1, wherein said external pipe has a diameter from $0.01\ D_R$ to $0.15\ D_R$, wherein $D_R$ is said fluidized bed reactor diameter.

9. The process according to claim 1, wherein at least one part of said condensed liquid enters said fluidized bed by passing through said distribution plate.

10. The process according to claim 1, wherein a gaseous stream is continuously passed through said fluidized bed, said gaseous stream comprises one or more monomers of formula $CH_2$=CHR, wherein R is hydrogen or a hydrocarbon radical having 1-12 carbon atoms.

11. The process according to claim 10, wherein said gaseous stream includes at least one C4-C8 alkane or cycloalkane as an inert condensable gas.

12. A continuous process for polymerizing olefins in a fluidized bed reactor, said process comprising:
continuously passing a gaseous stream comprising one or more α-olefin monomers through a fluidized bed with a polymerization catalyst under reactive conditions;
withdrawing a polymeric product and unreacted fluids from said fluidized bed reactor;
cooling part of said unreacted fluids below at least one dew point of said unreacted fluids to form a two-phase mixture comprising a gas and a condensed liquid; and
reintroducing said two-phase mixture into said fluidized bed reactor,
wherein said two-phase mixture is reintroduced under a distribution plate of said fluidized bed reactor such that at least one part of said condensed liquid is separated from said gas by a centrifugal effect forming a separated liquid, and said condensed liquid is fed above said fluidized bed through an external pipe connecting a bottom of said fluidized bed reactor to a position above an upper limit of said fluidized bed, the external pipe comprising an inlet below the distribution plate.

13. The process according to claim 12, wherein a separated liquid collects at a zone underlying said distribution plate before entering said external pipe.

14. The process according to claim 12, wherein a separated liquid enters said external pipe, said separated liquid comprises from 20 to 50% by weight of said condensed liquid.

15. The process according to claim 14, wherein said separated liquid flows upward in said external pipe without requiring a pumping device.

16. The process according to claim 14, wherein said separated liquid is introduced into said fluidized bed reactor at a position situated above said upper limit of said fluidized bed and below a velocity reduction zone.

17. The process according to claim 14, wherein said separated liquid is sprayed into said fluidized bed by an injection device.

18. The process according to claim 14, wherein said separated liquid comprises from 10 to 20% by weight of said gas entering said external pipe.

19. The process according to claim 12, wherein said external pipe has a diameter from $0.01\ D_R$ to $0.15\ D_R$, wherein $D_R$ is said fluidized bed reactor diameter.

20. The process according to claim 12, wherein at least one part of said condensed liquid enters said fluidized bed by passing through said distribution plate.

21. The process according to claim 12, wherein a gaseous stream is continuously passed through said fluidized bed, said gaseous stream comprises one or more monomers of formula $CH_2$=CHR, wherein R is hydrogen or a hydrocarbon radical having 1-12 carbon atoms.

22. The process according to claim 21, wherein said gaseous stream includes at least one C4-C8 alkane or cycloalkane as an inert condensable gas.

23. A continuous process for polymerizing olefins in a fluidized bed reactor, said process comprising:
continuously passing a gaseous stream comprising one or more α-olefin monomers through a fluidized bed with a polymerization catalyst under reactive conditions;
withdrawing a polymeric product and unreacted fluids from said fluidized bed reactor;
cooling part of said unreacted fluids below at least one dew point of said unreacted fluids to form a two-phase mixture comprising a gas and a condensed liquid; and
reintroducing said two-phase mixture into said fluidized bed reactor,
wherein said two-phase mixture is reintroduced under a distribution plate of said fluidized bed reactor such that at least one part of said condensed liquid is separated from said gas by a coalescence of liquid droplets and a consequent fall by gravity forming a separated liquid, and said condensed liquid is fed above said fluidized bed through an external pipe connecting a bottom of said fluidized bed reactor to a position above an upper limit of said fluidized bed, the external pipe comprising an inlet below the distribution plate.

24. The process according to claim 23, wherein a separated liquid collects at a zone underlying said distribution plate before entering said external pipe.

25. The process according to claim 23, wherein a separated liquid enters said external pipe, said separated liquid comprises from 20 to 50% by weight of said condensed liquid.

26. The process according to claim 25, wherein said separated liquid flows upward in said external pipe without requiring a pumping device.

27. The process according to claim 25, wherein said separated liquid is introduced into said fluidized bed reactor at a position situated above said upper limit of said fluidized bed and below a velocity reduction zone.

28. The process according to claim 25, wherein said separated liquid is sprayed into said fluidized bed by an injection device.

29. The process according to claim 25, wherein said separated liquid comprises from 10 to 20% by weight of said gas entering said external pipe.

30. The process according to claim 23, wherein said external pipe has a diameter from $0.01\ D_R$ to $0.15\ D_R$, wherein $D_R$ is said fluidized bed reactor diameter.

31. The process according to claim 23, wherein at least one part of said condensed liquid enters said fluidized bed by passing through said distribution plate.

32. The process according to claim 23, wherein a gaseous stream is continuously passed through said fluidized bed, said gaseous stream comprises one or more monomers of formula $CH_2$=CHR, wherein R is hydrogen or a hydrocarbon radical having 1-12 carbon atoms.

33. The process according to claim 32, wherein said gaseous stream includes at least one C4-C8 alkane or cycloalkane as an inert condensable gas.

* * * * *